April 24, 1928.
C. R. RANEY ET AL
1,667,391
CONVEYING AND FEEDING MECHANISM FOR HARVESTER THRASHERS
Filed Jan. 21, 1926
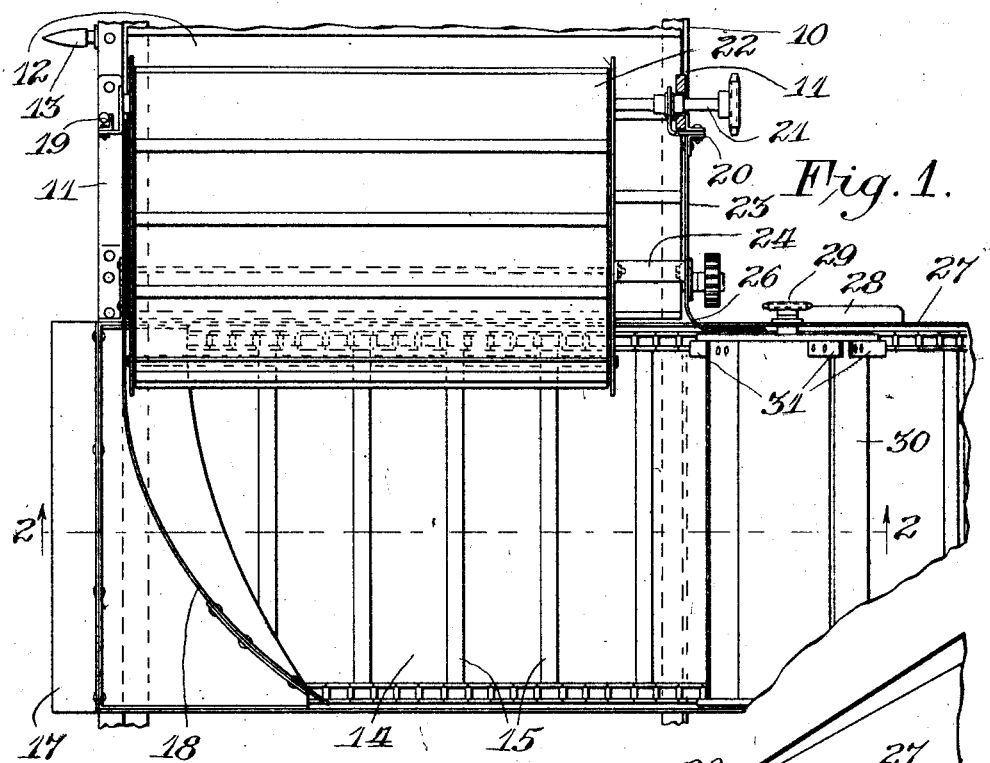
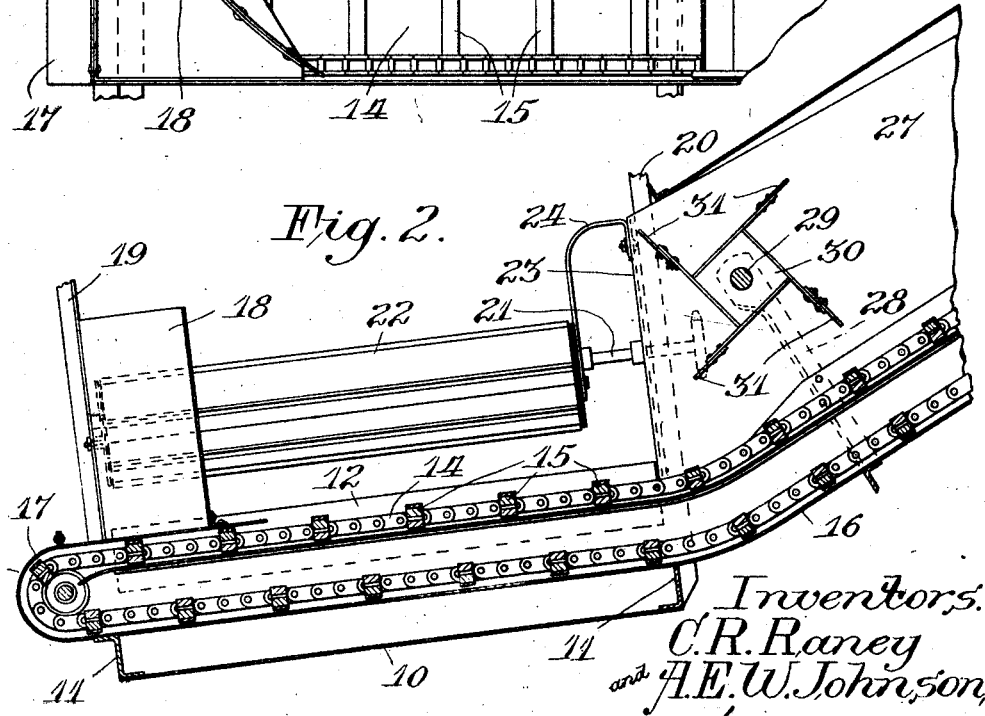

Patented Apr. 24, 1928.

1,667,391

UNITED STATES PATENT OFFICE.

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY.

CONVEYING AND FEEDING MECHANISM FOR HARVESTER THRASHERS.

Application filed January 21, 1926. Serial No. 82,692.

This invention relates generally to an improved conveying and feeding mechanism for harvester thrashers. More specifically it relates to a novel arrangement of the upper delivery platform conveyer for such feeding mechanisms.

Harvester thrashers as now standard in this art embody a main transversely disposed platform conveyer upon which the cut grain falls and is moved laterally to a longitudinally disposed and upwardly and rearwardly inclined feeder conveyer leading into thrashing mechanism. Thus, the cut grain in its path of movement moves in straight lines and must at the junction of the two conveyers make an abrupt right angle turn. To assist in the transfer of the grain from the platform conveyer to the feeding conveyer, a supplemental, upper platform conveyer has been provided, in the past. The grain in coming upon the feeding conveyer between the upper and lower platform conveyers, and in then making the abrupt right angle turn onto the feeding conveyer, would, when the grain was heavy, bunch and tangle at the turn, and especially would the head ends of the grain bunch and tangle at the inner corner of the turn.

The main object of this invention is to improve the delivery of grain from the platform conveyer of such machines to the feeding conveyer and prevent the objectionable bunching and tangling of the grain above described.

Other objects of this invention should be apparent to those skilled in this art as the description hereof progresses.

This very desirable object is accomplished by so locating the supplementary or upper platform conveyer and supporting it in such a manner that the objectionable bunching and tangling of grain at the turn cannot occur.

Reference should now be made to the accompanying sheet of drawings wherein an illustrative embodiment of this invention is shown, and wherein like reference characters designate the same parts. In these drawings,—

Fig. 1 is a plan view, showing the juncture of the transverse platform and the longitudinally disposed feeding mechanism; and Fig. 2 is a side sectional view of the same mechanism as seen along the line 2—2 of Fig. 1.

The improved conveying mechanism has been illustrated in combination with a standard harvester thrasher having the usual transversely extending platform 10, carried on the frame bars 11. The platform is provided with the usual endless apron conveyer 12 and the cutting mechanism at its front side indicated generally at 13.

The platform apron conveyer 12 is driven in a direction to move the cut grain falling thereon in a stubbleward direction. The frame bars 11 carry at their stubbleward ends the usual longitudinally disposed feeding conveyer 14, having cross slats 15, which conveys the cut grain rearwardly and upwardly to the thrashing mechanism, not shown. A tight sheet metal bottom 16 prevents loss of grain through the conveyer, and also surrounds the front end, as shown at 17. The front end of the feeder conveyer 14 lies in a plane slightly below the plane of the end of the main platform conveyer 12 and receives the grain therefrom, as will be obvious.

Extending upwardly from the housing 17 is an arcuately curved sheet metal front wall 18, which overlaps the platform, as shown in Fig. 1, for some distance in a grainward direction. It is made fast to a standard 19, as shown, which extends from the front frame bar 11. A rear upright 20 secured to the rear bar 11 is disposed in substantial fore and aft alinement with the front upright 19. Supported on these uprights, some distance above the platform, and in suitable bearings, is a shaft 21 which carries a roller, not shown, around which is trained an endless supplemental, or upper platform conveyer apron 22. A sheet metal wall 23 is secured to the upright 20 and rear frame bar 11, this wall 23 in turn being provided near its meeting point with the longitudinal feed conveyer, with a forwardly and downwardly extending bracket 24 which carries the other end of the upper platform conveyer 22. The opposite, or front end of the roller, is journaled in the front wall 18 in any suitable manner.

In this upper platform conveyer the driven roller on the shaft 21 is raised above the other, or stubblewardly disposed roller of this upper conveyer. In other words, the upper conveyer is downwardly inclined toward the feed conveyer 14. This construction of inclined upper conveyer is well known in this art.

It will be noted that the rear wall 23 is gracefully curved at 26 and bent back to overlap a side wall 27 for the elevating section of the feeding conveyer. By this construction, it will be seen that the upper platform conveyer 22 is forwardly spaced a substantial distance from the rear wall 23 of the platform, and, furthermore, that the stubbleward end of the upper platform conveyer overhangs the longitudinal feed conveyer 14.

Carried on the side walls of the housing for the upper inclined section of the feeder conveyer are frames 28 (only one being shown) in which is journaled a shaft 29 upon which is mounted a rotary beater 30 having bats or wings 31, as shown. This beater is so disposed that its bats may sweep the corner space provided by spacing the upper platform conveyer from the rear wall 23 and assist in keeping the grain moving around the turn and start it on its path upwardly on the feeder conveyer.

From the above the operation should be quite clear. However, a general description of the operation will be briefly made. The grain, as it is cut, falls back on the main platform conveyer 12 and is moved stubblewardly to the longitudinally disposed feeding conveyer 14 upon which the grain then passes. The upper platform conveyer 22 is so disposed above the main platform conveyer that the grain must pass between the two, as is usual in this art. The upper conveyer overhangs the feeder conveyer 14 to insure a better transfer of the grain to the feeder conveyer. The path of the moving grain is now around a right angle turn. The rounding of the wall corner 26 in combination with the space provided by spacing the upper platform conveyer 22 forwardly of the rear wall 23 insures at all times that the grain, and particularly the head ends thereof, will not tangle and bunch at the turn. The beater 30 assists to keep the turn clear, as will be obvious, and serves also to move the grain onto the inclined section of the feeder conveyer 14.

It will now be seen that a simple and efficient arrangement has been provided which will achieve the objects of this invention, as heretofore stated. Of course, it is to be understood that the illustrative embodiment shown is not necessarily the only form which this invention may assume in practice, and that the invention is capable of change without departing from the scope and spirit thereof, as appears in the annexed claims.

What we claim is:

1. In a harvester, the combination of a main transversely disposed platform conveyer, a longitudinally disposed feeding conveyer communicating therewith, and an upper supplemental platform conveyer overhanging the feeding conveyer and being of narrower width than the main platform conveyer.

2. In a harvester, the combination of a main transversely disposed platform conveyer, a longitudinally disposed feeding conveyer communicating therewith, and an upper supplemental platform conveyer, said upper conveyer being spaced from the rear side of the main platform conveyer.

3. In a harvester, the combination of a main transversely disposed platform conveyer, a longitudinally disposed feeding conveyer communicating therewith, a wall along the back side of the main platform conveyer, and an upper supplemental platform conveyer carried by said wall and substantially spaced forwardly thereof.

4. In a system of conveyers for harvesters the combination of a main transverse conveyer, a longitudinal conveyer communicating therewith at right angles, a wall shaped to enclose the inner angle between the two conveyers, and an upper transverse conveyer disposed above the main transverse conveyer supported by said wall and spaced substantially therefrom.

5. In a system of conveyers for harvesters, the combination of a main conveyer, a second conveyer receiving the material handled from the first conveyer and disposed at a right angle thereto, a wall positioned at the rear of the main conveyer, a wall positioned at the front of the main conveyer, a shaft journaled in the walls supporting one end of a third conveyer disposed in line with and above the main conveyer, and means carried by the rear wall for supporting the other end of said third conveyer in a manner to leave a substantial space between the third conveyer and said rear wall.

6. In a system of conveyers for harvesters, the combination of a main conveyer, a second conveyer receiving the material handled from the first conveyer and disposed at a right angle thereto, a wall positioned at the rear of the main conveyer, a wall positioned at the front of the main conveyer, a shaft journaled in the walls supporting one end of a third conveyer disposed in line with and above the main conveyer, said third conveyer overhanging the main conveyer, and a bracket carried by the rear wall for supporting the other end of said third conveyer in a manner to space it a substantial distance from said rear wall.

7. In a harvester, the combination of a main conveyer, a second conveyer meeting the main conveyer at a right angle to receive material therefrom, a wall at the rear of the main conveyer, a third conveyer supported by the wall, said conveyer overhanging the main conveyer and being spaced a substantial distance from said wall, the second conveyer having an upwardly inclined elevating portion enclosed in a housing, and a beater carried in the housing above the inclined portion of the second conveyer.

8. In a harvester, the combination of a main transversely disposed platform conveyer, a longitudinally disposed feeding conveyor having a rear upwardly inclined elevating portion communicating at right angles with the main conveyer, an upper platform conveyer in line with and above the main conveyer and being of a narrower width than the main conveyer so as to leave an uncovered space at the rear side of the main conveyer, and a beater carried in the housing above the inclined portion of the feeding conveyer adjacent the uncovered space mentioned.

In testimony whereof we affix our signatures

CLEMMA R. RANEY.
ARNOLD E. W. JOHNSON.